Sept. 7, 1937.　　　　L. R. RUNALDUE　　　　2,092,560
ALARM SYSTEM FOR FLUID FILLED CABLES
Filed Nov. 26, 1935　　　3 Sheets-Sheet 1

Inventor:
Lewis R. Runaldue,
by Harry E. Dunham
His Attorney.

Sept. 7, 1937.                L. R. RUNALDUE                2,092,560
                    ALARM SYSTEM FOR FLUID FILLED CABLES
                    Filed Nov. 26, 1935        3 Sheets-Sheet 3

Inventor:
Lewis R. Runaldue,
by Harry E. Dunham
His Attorney.

Patented Sept. 7, 1937

2,092,560

UNITED STATES PATENT OFFICE 2,092,560

ALARM SYSTEM FOR FLUID FILLED CABLES

Lewis R. Runaldue, Pittsfield, Mass., assignor to General Electric Company, a corporation of New York Application November 26, 1935, Serial No. 51,599

22 Claims. (Cl. 177—311)

There are in operation at the present time cable systems comprising independent cables, each cable operating as a part of a three phase electrical system of distribution. Each of the cables is filled with an insulating fluid such as degasified oil which expands and contracts with temperature changes and especially those due to changes in load on the cables. To take care of these volumetric changes due to temperature changes, variable capacity pressure reservoirs are employed for each cable and connected thereto at spaced intervals, said reservoirs maintaining superatmospheric pressure on the fluid at all times. The reservoirs are commonly located in manholes below the street level where they are securely fastened in place and are relatively inaccessible. A suitable and common form of reservoir for the purpose comprises a tank or casing sealed against the atmosphere and containing a plurality of individual, sealed cells having elastic side walls, said cells being connected in parallel to a manifold and the latter connected to the cable through one of the joints therein. In certain cases the space within the tank not occupied by the cells is filled with gas under super-atmospheric pressure.

The successful operation of such a cable system depends upon maintaining the cables filled with insulating liquid at a pressure above that of the atmosphere. This in turn means that the amount and pressure of the liquid in the reservoirs must not fall below a certain determined minimum or rise above a certain determined maximum. If the supply of liquid fails for any reason, such as a leak in the cable parts, it results in injury to the cable insulation and if the pressure of the liquid unduly increases, it is liable to injure the cable sheath by stretching or bursting it. To guard against such injuries to the cables, it has been the practice to provide as a part of each of the reservoirs of the system a device which gives a suitable signal at a selected point or station when the amount of liquid in each reservoir falls below the determined minimum or increases above the determined maximum. When such a signal is given, the service men proceed to the manhole where the signal originated and make the necessary repairs. This arrangement while satisfactory in a great many cases has the disadvantage that the signal is not given, especially in the case of the minimum, until the supply of liquid in the reservoir is largely exhausted, and if the leak is a substantial one, the entire contents of the reservoir may be discharged as well as a portion of the fluid from the cable before the service men arrive. It is important to correct for an over supply of liquid in the reservoir but not so important as promptly to correct for an under supply. For various reasons, including cost and lack of space in manholes, it is desirable not to use and in most cases it is impractical to use larger reservoirs than are now employed.

In a three phase system of electrical distribution using separate cables, one for each phase, assuming normal operating conditions, the pressures exerted by the reservoirs connected to the cables and located in the same region or manholes and the quantity of liquid therein will rise and fall at substantially the same rate in the same interval of time. Under an abnormal condition due for example to a leak, one of the reservoirs will lose pressure and liquid at a different rate than the others, and the problem presented is how to detect this departure from normal soon after it begins to take place instead of waiting until the supply of fluid is practically exhausted. This is accomplished according to my invention by the provision of pressure responsive relay mechanism which on the one hand takes into account the pressure of the fluid within a reservoir operating normally, and on the other hand a percentage difference in the pressure of the fluid within a reservoir which is operating abnormally. From one point of view the fluid pressure within a normally operating reservoir as distinguished from the weight or quantity of the fluid, is utilized as a standard of comparison, and when a companion reservoir departs by a definite percentage from that standard pressure, an alarm or signal is caused to be made. An important and distinguishing feature of my invention is that the system depends for its action on a percentage change of fluid pressure in one cable or reservoir with respect to that in another cable or reservoir.

An object of my invention is the provision of an improved alarm system for fluid filled cable systems of the character described which utilizes pressure responsive means promptly to indicate at a selected point or station when the pressure within a reservoir supplying fluid to one of the cables of said system has departed from its predetermined cycle of operation as compared to that of another reservoir on the same system by more than a selected percentage, and therefore the volume of reserve fluid has departed by more than a selected percentage.

A further object of my invention is the provision in a fluid filled cable system operating on the multi-phase plan with single conductor cables of an alarm system therefor of an improved simple relay means responsive to the differential action of the pressures in a pair of pressure reservoirs connected to different cables of the system which causes a signal to be made at a selected point or station.

A further object of my invention is the provision in a fluid filled cable, which is divided into sections by fluid stop joints, of differential pressure responsive means for indicating when a given section is operating abnormally with respect to a connected section electrically forming a part of the same system.

For a consideration of what I believe to be novel in my invention, attention is directed to the accompanying description and the claims appended thereto.

In the accompanying drawings which are illustrative of my invention.

Figure 3:
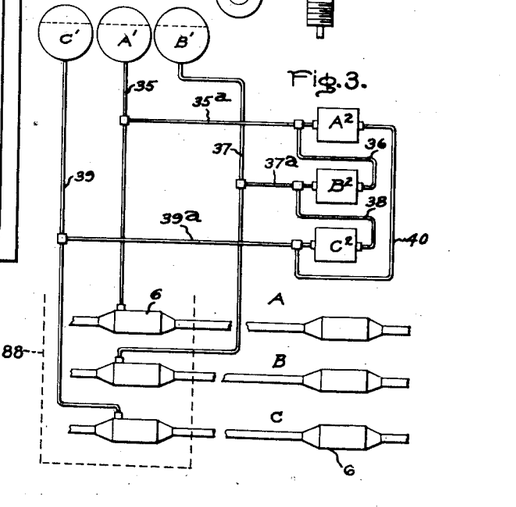
Fig. 3 is a diagrammatic illustration of a three phase fluid filled cable system; Figs. $4^a$ and $4^b$ are diagrams of pressure volume curves of reservoirs.
Figure 5:
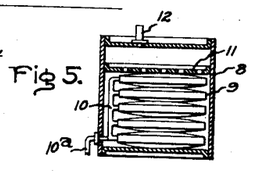
Fig. 5 is a detail view of a pressure reservoir.

Referring to Fig. 3, A, B and C indicate three separate cables of a three phase system of electric distribution, each comprising an insulated conductor, an enclosing sheath, a channel and a filling of fluid insulation for the channel of which degasified oil may be regarded as an example but not as a limitation since other fluids may be employed. These cables are or may be of any usual construction. Each cable as usual is made in lengths and the lengths are connected by suitable joints 6 which may be normal joints, feeding joints, stop joints or semi-stop joints of any suitable or usual construction. Each length, or two or more of such lengths forming a section, are segregated from each other as regards the flow of fluid insulation from one to the other. Each cable of each section is supplied with fluid insulation from one or more variable capacity pressure reservoirs, each located above its cable and connected to the cable through a suitable joint. As shown, reservoir A' supplies phase A, reservoir B', phase B and reservoir C', phase C. A suitable reservoir for the purpose is illustrated in Fig. 5 in which 8 indicates a sealed tank or casing adapted to be securely fastened in place and containing a plurality of sealed cells 9, each having flexible side walls defining a chamber between them. The chambers of the cells are connected in parallel by a manifold 10 and the manifold in turn is connected to the fluid containing channel of the cable by a conduit $10^a$. Above the cells is a perforated partition 11 which with the bottom wall of the casing, limits the expansive movements of the walls of the cells. The space or chamber within the casing not occupied by the cells is filled with a gas compressed to some predetermined value depending upon the requirements of the cable installation. The gas may with advantage be some neutral or inert gas such as $CO_2$, for example. The pressure of the gas normally is the same for all of the reservoirs in the same manhole. This pressure may and usually will differ from that of reservoirs located in other manholes, particularly where some of the cable lengths or sections are at different levels or differ in lengths. Each casing is provided with a valved fitting 12 through which gas under pressure may be admitted or withdrawn from the gas chamber. The type of pressure reservoir disclosed herein has the great advantage over atmospheric type feeding reservoirs in that it need not be elevated above the cable in order to create a sufficient head to feed liquid into the cable since the compressed gas within the casing of the reservoir acting as it does on the walls of the cells suffices for this purpose. Moreover, such reservoirs avoid the use of expensive towers which are necessary with those of the atmospheric gravity feed type. Another advantage residing in the use of pressure type reservoirs is that the pressure exerted on the fluid within the cable can be adjusted at will by changing the gas pressure. With a gravity feed atmospheric type reservoir, a change of fluid pressure in the cables involves a change in elevation of the reservoirs. Wherever such pressure reservoirs are used, they will be located in the same manholes as the cable joints and may be supported on the roof thereof or on a side wall near the roof, whichever is the more convenient.

Figure 4A:
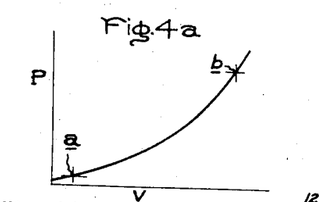

Fig. $4^a$ is a diagram illustrating the pressure volume curve of a pressure type reservoir in which P indicates pressure and V volume where there is no pressure due to head. The heavy upwardly curved line indicates the change of pressure of the insulating fluid within the reservoir as the volume changes, for example from 1 to 12 pounds per square inch. All three reservoirs in a given location on the same three phase system comprising three single conductor cables should under normal operating conditions exhibit substantially the same pressure volume characteristics.

Figure 4B:
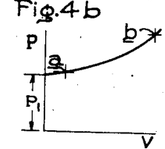

Figure $4^b$ is a diagram illustrating the pressure volume curve of a pressure type reservoir where there is pressure present due to head of the insulating fluid. Such would be the case for a reservoir located at the bottom of a hill or rise. The pressure P' is due to the head of fluid above the reservoir and is known to those familiar with the art as "pressure head". It will be noted that the shape and size of the curves in Figs. $4^a$ and $4^b$ can be the same but the curve of Fig. $4^a$ is displaced by the ordinate P' in Fig. $4^b$. On the other hand the curves need not be the same shape and size. For reservoirs connected to the same cable section not separated by stop joints but at different elevations, they would be approximately the same size and shape but displaced as to ordinates.

In the following description references to pressure will be understood to mean actual pressure minus pressure head. Since with an actual pressure in the reservoir equivalent to the pressure due to head the oil reserve volume will be zero, my improved apparatus is made to take pressure head into account.

Normally, the operation of a reservoir is confined to that portion of the curves between a and b and the minimum and maximum alarm systems heretofore in use actuated a signal when the pressure of the fluid dropped to $a$ for the low indication and increased to $b$ for the high indication.

Assuming that one of three cables of the system develops a leak at any point either in the joints or in the cable sheath, and the other two cables continue operating in the normal manner, there will with prior arrangements above mentioned be no indication of the leak until the pressure in the defective cable falls to point $a$, when the signal is given, and while theoretically this should give ample time as a matter of practice, such may not be the case and in any event the period of time in which to correct the trouble is or may be too short. It is to be noted with the aforesaid minimum and maximum alarm system that the reservoirs of the good cables being entirely independent in their actions have no effect whatsoever on the indication respecting the damaged cable. In my improved system on the contrary the pressure within the reservoir of a good cable is utilized in a manner to modify the action of the alarm device associated with the injured cable after a predetermined percentage change of fluid pressure within the reservoir of the damaged cable has taken place. The action is based on a percentage change as distinguished from an actual change in pounds per square inch in a given reservoir, particularly since the minimum pressure setting is the same with all the reservoirs and is or may be only a small amount above atmospheric pressure. It is apparent from the pressure volume curve that while a drop of say three pounds pressure at the upper end of the curve would not be injurious, a similar drop in pounds at the low end of the curve would result in a subatmospheric pressure in the cable which is a thing to be avoided for well known reasons. From one point of view, the pressure condition within a good reservoir is used as a standard of comparison and this irrespective of the particular pressure existing therein, (it being recognized that its pressure will vary), at the time the leak develops in the injured cable which tends unduly to deplete the supply of fluid in its reservoir, and the relay operates an alarm when the percentage difference of the pressures in the good reservoir and the reservoir to which the leaking cable is connected exceed the predetermined value. For the present purposes, an arbitrary pressure difference of 25% has been chosen as the permissible change before the alarm is given but it may be greater or less, depending upon the characteristics of the cable installation. Whatever value is chosen, it is constant for a given operating condition.

Again, I would like to point out that the pressures referred to above are the actual pressures minus the pressure head. The pressure head for any reservoir position is constant. The reason for the comparison of the actual pressure minus the pressure head in one cable to the actual pressure minus the pressure head in another cable may be more easily understood by examining Fig. 4a and Fig. 4b. A 25% drop in volume from point $b$ on the curve would mean an approximate change of 25% in the pressure difference between the pressure at which the volume is at $b$ and the pressure at which the volume is zero. Means are provided in my system to compensate for pressure head so that a percentage pressure change of the actual pressure minus the pressure head of the leaking or damaged cable as compared to the actual pressure minus the pressure head of the good cable is the basis for operating an alarm. For this reason the device operates on a percentage reserve volume change of a leaking or damaged cable as compared to the reserve fluid volume in a good cable.

Figure 1:
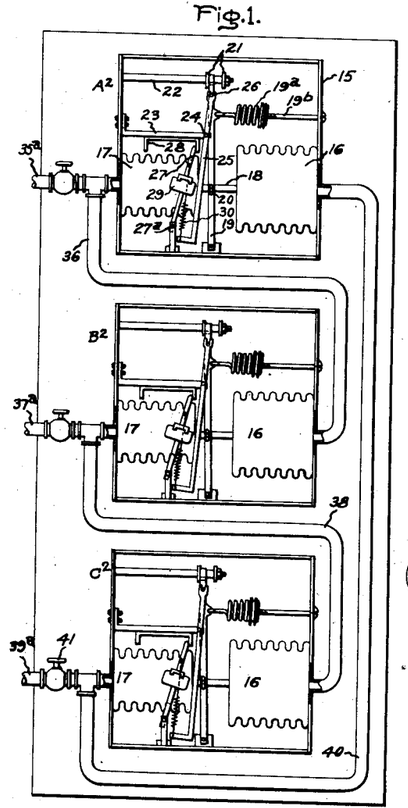
Fig. 1 is a diagrammatic view of a differential relay mechanism for use with an installation comprising three single conductor fluid filled cables operating three phase.
Figures 12, 13:
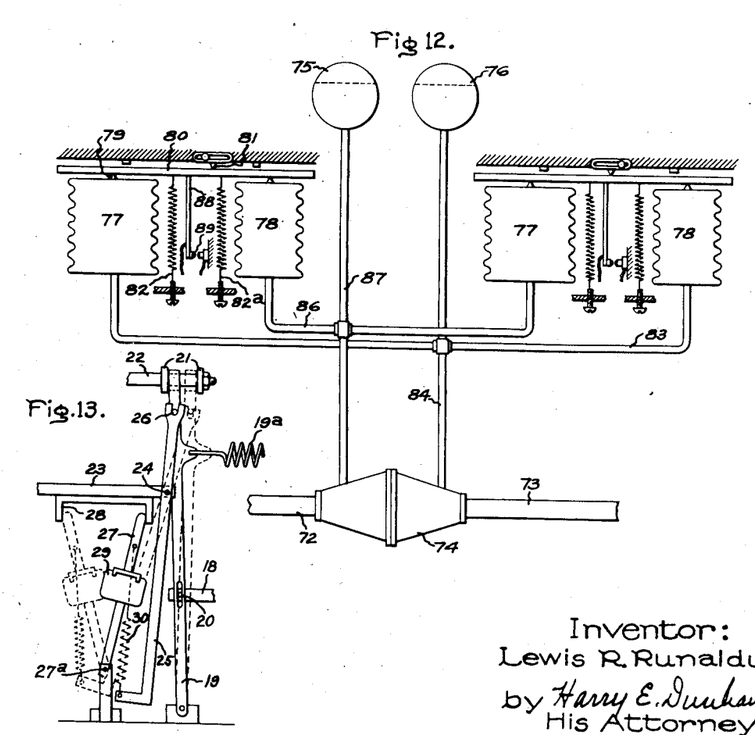
Fig. 12 illustrates the invention as applied to two sections of a cable with a fluid stop joint between sections.
Fig. 13 is a detail view of the mercury switch operating means on an enlarged scale.

Relays $A^2$, $B^2$ and $C^2$ are provided for the phase A, B and C, Figs. 1 and 3. Each comprises as in Fig. 1 a suitable casing or support 15, which suitably encloses the parts and is open to the effects of atmosphere. Located on the support is a diaphragm 16, in this case shown as being of the sylphon type made of thin corrugated metal so as to be quite flexible in the direction of its axis. A second diaphragm 17 of similar construction is also provided which, to correspond to the pressure differential selected, is 25% smaller than diaphragm 16. The diaphragms are in axial alignment and the adjacent heads are connected by a rod 18 which has an axial movement under the joint operations of the diaphragms. 19, Figs. 1 and 13, indicates a lever which is pivoted at its lower end to the casing and has a pin and slot connection 20 with a rod 18. The upper end of the lever is designed to move back and forth between adjustable stops 21 carried by a rod 22. To the upper end of the lever 19 is attached an extension spring 19a which is adjusted by the screw threaded member 19b. By turning the screw in one direction or the other, the tension of the spring can be varied to compensate for pressure head. When adjusted for a pressure head the spring 19a holds the upper end of the lever in engagement with the right hand stop with no pressure in either diaphragm. When there is no pressure head, the spring is released so that it exerts no force on lever 19. 23 indicates a bracket secured to the frame and which supports a pivot 24 for the vertically inclined L-shaped lever 25. The upper end of the lever has a fork which embraces a pin 26 carried by the diaphragm actuated lever 19. 27 indicates an arm pivoted at its lower end and designed to move between stops formed by the ends of the inverted channel-shaped member 28. On the arm is mounted a controller such as a mercury switch 29 of any ordinary or suitable construction which by its position controls the passage of current through the leads extending therefrom to the alarm circuit wires. To cause the switch to operate with a snap action, an extension spring 30 is provided having its upper end attached to the arm and its lower end to the short arm of the L-shaped lever 25. The full lines in Fig. 13 show the switch and its actuating parts in one position and the dotted lines in the other position.

The relays in Fig. 1 show the positions of the levers, diaphragms and switches when pressures are normal in all three phases, i. e. equal and above pressure head. As long as conditions are normal, the upper ends of the levers 19 will rest against the left hand side of stops 21 and the mercury switches will be in the positions shown.

Assuming that the fluid pressure (actual pressure minus head pressure) in the larger diaphragm 16 and its connected reservoirs, falls by an amount greater than the differential of 25%, the upper end of lever 19 will be moved to the right and in so doing actuates the L-shaped lever 25 in a manner to cause the lower end of the spring 30 to move across or over the pivot 27a of the switch carrying arm 27 with the result that the upper end of the arm moves over to the left hand stop and in so doing tilts the mercury switch 29 sufficiently to cause the alarm system to operate. Assuming a re-establishment of the normal pressure conditions of the diaphragms by any means, the movement of the lever 25, arm 27 and switch 29 will be reversed whereupon the parts will return to the positions shown.

The operation of my improved system depends for its successful operation upon having the alarm system responsive to pressure conditions existing in two reservoirs and their connected cables. To this end, each relay device is connected to two reservoirs and their associated cables, the small diaphragm to one cable and the large diaphragm to a second cable. Specifically reservoir A' Fig. 3 is connected to phase A cable by the conduit 35, and by a branch pipe 35a is connected to the small diaphragm of relay A². A second branch pipe 36 connects the reservoir A' and conduit 35 to the large diaphragm 16 of relay B². Reservoir B' is connected to phase B cable by the conduit 37, and a branch pipe 37a connects it to the small diaphragm of relay B². A second pipe 38 connects the reservoir B' and conduit 37 to the large diaphragm 16 of relay C². Reservoir C' is connected to phase C cable by the conduit 39 and a branch pipe 39a connects it to the small diaphragm of relay C². A second branch pipe 40 connects the reservoir C' to the large diaphragm 16 of relay A². The sylphons are relatively small and light in weight and are sensitive to small changes of pressure. Also because of their construction, the relays may be located at convenient places and need not be incorporated as a part of the reservoirs, thereby simplifying the installation as a whole. It will be seen that each relay is connected to two phases of the cable system and hence its action will depend upon the pressure conditions in two phases as distinguished from the pressure condition of the fluid in a single phase. The various pipes will have the necessary shut-off valves of which valves 41 Fig. 1 may be taken as illustrations. To simplify the illustration only three reservoirs are shown but it is to be understood that a greater number will ordinarily be used and located in the reservoir containing manholes at different parts of the cable installation.

With equal pressures in any two phases connected to the same relay, for example A and B connected as above described, a greater force is exerted by the larger diaphragm 16 than by the smaller diaphragm 17 due to the fact that its area is 25% greater. The extension spring 19a is so adjusted as to compensate for pressure head. Assuming that the actual pressure minus pressure head in phase A falls below the predetermined differential of 25% due to a leak, this will result in a drop of pressure within sylphon 17 of relay A². Because the pressure in sylphon 16 connected to phase C by pipe 40 remains unchanged, and because lever 19 of relay A² is against the left hand stop, no movement of the mercury switch 29 of said relay can take place. The reduction of pressure in phase A due to the leak will by reason of the pipe 36 also cause a reduction of pressure in the large diaphragm 16 of relay B², and since the pressure in the smaller sylphon 17 of said relay remains unchanged, it will overpower sylphon 16 thereof and swing the upper end of its lever 19 to the right which action throws the mercury switch to the left and actuates the alarm. In other words, while the trouble is in phase A, the alarm is actuated by the relay B² of phase B, but since all of the relays are in the same location or manhole, this is satisfactory. The dotted lines in Fig. 13 indicate the changed position of the parts as above described.

Assuming that there is an abnormal increase of pressure (actual pressure minus pressure head) in phase A of over 25% and that phase C is operating normally, the smaller sylphon 17 of relay A² will overpower sylphon 16 thereof and the upper end of lever 19 will swing to the right and throw the mercury switch 29 to the left, see dotted lines Fig. 13, and cause an alarm to be given. The pressure in sylphon 16 of relay B² will correspondingly increase due to the connecting pipe 36 but because the upper end of its lever 19 is against the left hand stop, no movement of the mercury switch can take place. This means that a percentage increase of pressure in phase A over that in phase B causes relay A² to actuate the signal system, whereas a percentage decrease of pressure in phase A over that in phase B causes relay B² to actuate the signal system. If desired the parts may be so arranged that the reverse takes place, i. e. the relay A¹ to operate on a decrease of pressure in phase A, and the relay B² to operate on an increase of pressure in phase A.

After installing the signal system and relays, the resistance of the wires thereof to the several manholes or locations is carefully measured by suitable instruments and charted so that it becomes a simple matter thereafter to determine from the data previously obtained the location of the manhole in which one of the relays has acted.

Having located the manhole or location where an abnormal condition exists, it is a simple matter to ascertain which phase is in trouble by testing the pressures in the several reservoirs, which testing is desirable in any event. Since the same action takes place in the other relays upon the determined percentage change of pressure within the cables and reservoirs of the other phases, further description is unnecessary. If it be desired to indicate at the station which of the several reservoirs in a given manhole or location is operating abnormally without first testing for pressure, this can be done by increasing the number of signal wires.

The diaphragms of the relays have been shown as connected to the liquid side of the reservoirs but they may be connected to the gas side thereof if desired, the mode of operation being the same in both cases. Usually the reservoirs and relays will be located in the same manhole, such as indicated in dotted lines 88 in Fig. 3.

Figure 2:
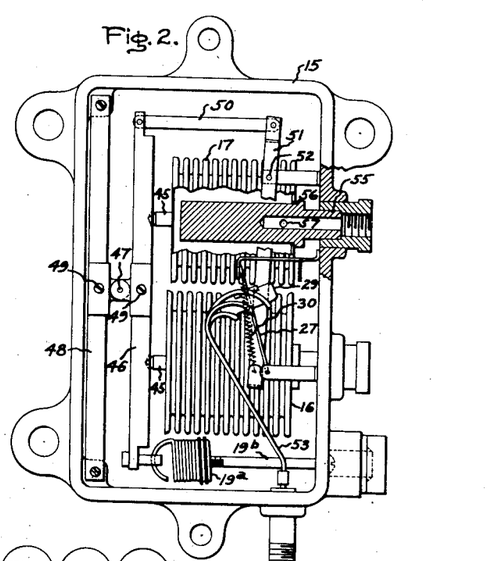
Fig. 2 is a structural embodiment of a relay of slightly different construction than those shown in Fig. 1.

In Fig. 2 is shown a structural form of relay in which the bellows diaphragms 16 and 17 are located side by side instead of in axial alignment. The head of each diaphragm is provided with a pin 45 having a conical end resting on a seat formed in a rocking lever 46, the latter having an adjustable pivot pin 47 supported by a bar 48 secured at its ends to lugs carried by the casing 15. The pivot pin 47 and the slidable parts supporting it are held in adjusted positions by the clamping screws 49. The diaphragm lever 46 through link 50 actuates a swinging lever 51 having a pivot 52 carried by a bracket secured to the casing. A pivoted arm 27 carries a controller or switch 29 comprising a glass container in which there is a body of mercury for making and breaking the circuits of signal wires 53 connected to and projecting through the container. An extension spring 30 is connected at its lower end to the lower end of the swinging lever 51 and at its upper end to the arm 27 so that as the lower end of the lever 51 moves back and forth, the spring as it moves past the pivot of the arm 27 causes the switch to be tilted with a snap action to make or break the signal circuit. Fluid which may be gas or insulating liquid under pressure is admitted to each of the bellows diaphragms through a member 55 which has a shoulder 56 serving as an abutment for the diaphragm and a small orifice 57 for admitting fluid to the chambered interior thereof. The smaller diaphragm may be considered as connected to phase A and the larger one to phase C. The larger diaphragm 16 has an effective area which is 25% greater than that of the smaller diaphragm 17 for the reason previously given. To balance the effect of pressure head and to compensate for it an extension spring 19a is provided which may be adjusted by the threaded rod or screw 19b.

Figures 6, 7:
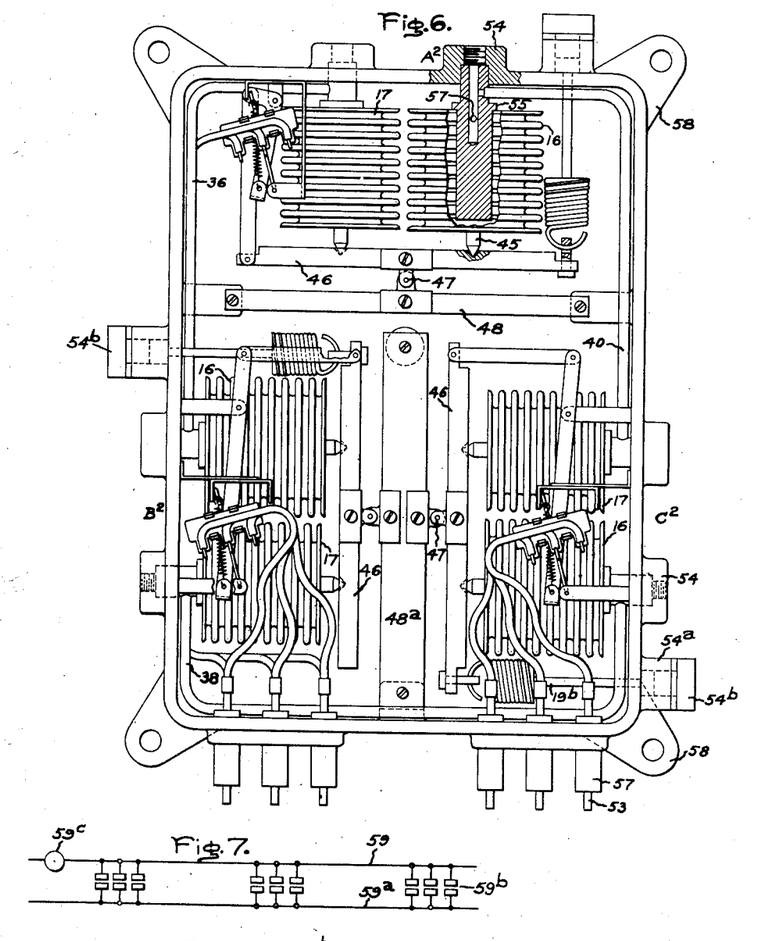
Fig. 6 is a structural embodiment of a three phase relay.
Figs. 7, 8 and 9 indicate signal systems.

In Fig. 6 is shown an arrangement of parts such that the relays for the three necessary reservoirs of an electric system of distribution operating three phase may be enclosed in a common casing of reasonable size. The arrangement also permits of locating the small pipe connecting the reservoirs and circuit wires of the signal system within the casing where they are protected from injury. Each of the relays is of the construction described in connection with Fig. 2. The casing which may be of cast metal has four lugs or ears 58 at its corners whereby it may be mounted in place on a wall or other support inside of a manhole. One of the relays is located in the upper part of the casing with its diaphragm or tilting lever 46 arranged horizontally. The other two relays are arranged in the lower part of the casing with their rocking levers 46 arranged vertically. The adjustable pivots for these two levers are carried by a common vertically arranged support 48a.

Fig. 6 also illustrates the small pipes which connect the various diaphragms. It will be assumed that the upper relay corresponds to relay $A^2$ in Fig. 3, the left hand lower relay to relay $B^2$ and the right hand lower relay to relay $C^2$. The pipe 36 within the casing in this case connects the small diaphragm 17 of relay $A^2$ to the large diaphragm 16 of relay $B^2$, the pipe 38 connects the small diaphragm 17 of relay $B^2$ to the large diaphragm 16 of relay $C^2$, and the pipe 40 connects the large diaphragm 16 of relay $A^2$ to the small diaphragm 17 of relay $C^2$. The arrangement of the last mentioned connection clearly shows how fluid under pressure enters the diaphragm through the aperture 57. The casing is provided with external bosses 54 aligned with the members 55 and may be internally threaded to receive the heavier pipes leading from the relay casing to the reservoirs. Bosses 54a are also provided for the heads of the adjusting screws 19b, the openings therein being closed by caps 54b. The signal circuit wires 53 are brought out through suitable insulating bushings and packings 57.

In Fig. 7 is shown a two-wire signal system of the open type in which 59 and 59a indicate circuit wires that extend between the cable manholes and some selected station. The wires are in open circuit relation and a circuit is established when any of the pair of contacts 59b are closed by the body of mercury in a controller. 59c indicates a signal device in the station which is actuated by current flowing through the circuit wires. Current for signaling purposes may be supplied to the circuit wires by any low voltage source.

Figure 8:
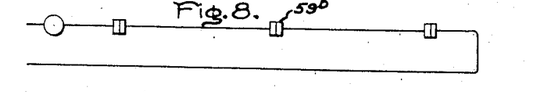

In Fig. 8 is shown a two-wire signal system of the closed type. In this case the contacts 59b are normally closed as for example by being bridged by the body of mercury in the tilting controller or switch 29 previously referred to. With this arrangement, the lamp 59c normally will be illuminated and will go out when the circuit is interrupted.

Figure 9:
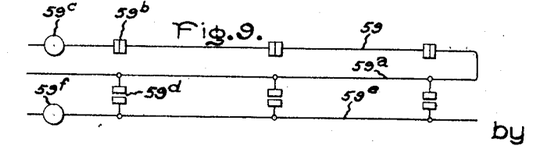

In Fig. 9 is shown a three-wire signal system in which two sets of contacts 59b and 59d are provided. In this case the contacts 59b are normally closed by the mercury in the switch and the signal 59c, such as a lamp, may when lighted be taken as indicating that the cable system is operating satisfactorily so far as oil conditions are concerned. The contacts 59d are normally open and when the glass enclosed mercury switch 29 is tilted to its opposite position will open the contacts 59b and close the contacts 59d which causes current to flow from wire 59a through the wire 59e to signal device 59f in the selected station. As will be evident from the foregoing, the mercury switch will necessitate two sets of end contacts so that when the mercury flows to one end and closes the circuit, the contacts at the other end will be open circuited.

Figure 10:
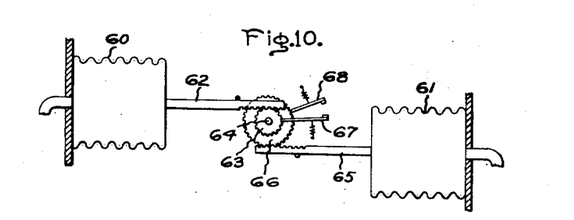
Figs. 10 and 11 indicate a modified form of differential relay.

The diaphragms previously described operate differentially by reason of the difference in effective areas. This differential effect may be obtained in another way by using diaphragms of the same size as shown in Fig. 10. For example, reservoirs A' and B' and their connected cables of phases A and B to be protected are connected to identical bellows diaphragms 60 and 61. The pressures within the two bellows diaphragms will vary as the load and ambient temperature conditions of the cables change, and the opposed end faces of the bellows are free to move toward and away from each other. For equal pressure changes in both bellows, the free ends thereof will move equal distances since the bellows have identical characteristics. To the movable end or head of bellows 60 is attached a suitably guided rack 62 which in turn imparts rotary motion to a pinion 63 mounted to turn freely on a fixed spindle 64. Similarly to the movable head of bellows 61 is attached a suitably guided rack 65 which in turn imparts rotary motion to a pinion 66 mounted to turn freely on the fixed spindle 64. The respective diameters of the pinions are so selected that equal movements of the bellows cause the larger pinion 66 to have 75% of the angular movement of the smaller pinion 63. Although a 75% relation of the diameters has been mentioned, this can be changed if it be desired to have a signal given when the desired pressure difference of the fluid in a pair of reservoirs is to be greater or less. The arrangement is such that the pinions will make approximately one revolution for the maximum pressures to be encountered. On the smaller pinion is mounted an arm 67 carrying a contact at its free end, and on the larger pinion is mounted an arm 68 carrying a contact at its free end. The contacts are connected to the circuit of the alarm system. Should the pressure in the bellows 60 fall to 75% of that in the bellows 61, the movement of bellows 60 will be 75% of that of bellows 61. The angular rotation of the smaller pinion 63 under these conditions would be 75% of what it would have been before the drop in pressure in bellows 60. The angular rotation of the two pinions would in this case be equal since the smaller pinion 63 had a 75% angular movement when the pressures in both bellows were equal. The movements of the pinions would in turn cause the contacts on the arms 67 and 68 to engage and the signal system to operate.

Figure 11:
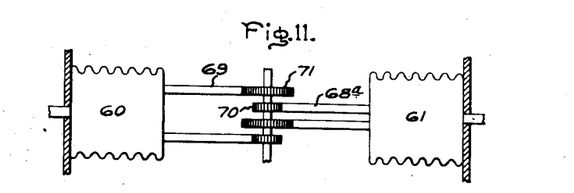

As shown in Fig. 11, by the addition of another pair of racks 68ª and 69, one for each bellows diaphragm, and two additional pinions 70 and 71 with the smaller pinion actuated by bellows 61 and the larger by bellows 60, the alarm may be made to operate when the pressure in bellows 61 falls to 75% of that in bellows 60. For simplicity of illustration, the arms 67 and 68 in Fig. 10 are shown as carrying the contacts for the signal system. In practice, the pinions will be arranged to actuate quick make and break switches, as for example of the tilting mercury type previously described. To simplify the illustration the arms and controls have been omitted from Fig. 11.

My invention may also be utilized for protecting adjacent sections of a fluid filled cable which are separated by stop joint that prevents the flow of fluid from one section to the other. It is more especially useful in connection with multi-conductor cables. A suitable arrangement for the purpose is illustrated diagrammatically in Fig. 12 wherein 72 and 73 indicate fluid filled cables of different sections with a fluid stop joint 74 between them. 75 and 76 indicate reservoirs of the character heretofore described in connection with Fig. 5. The pressure volume curves of these reservoirs are of the general shape illustrated in Fig. 4ª and Fig. 4ᵇ but if there be a difference in elevation of the cables, the pressure heads will be different. Also the difference of pressures for a certain percent volume in both reservoirs will generally be different.

Each relay comprises a pair of sylphon diaphragms 77 and 78, the former being larger than the latter. The two diaphragms at their free ends have knife edge pivots 79 which engage a lever 80, the latter having an adjustable pivot 81 carried by a slotted holder, the latter being held in adjusted position by a clamping screw. The diaphragm 77 is connected by the pipes 83 and 84 with reservoir 76 and the interior of the cable 73 and to diaphragm 78 of the second relay. The smaller diaphragm 78 of the left hand relay is connected by pipe 86 with the larger diaphragm 77 of the right hand relay and by pipe 87 with reservoir 75 and the interior of the fluid filled cable 72. To the lever 80 is attached an arm 88 carrying or actuating a contact 89 forming a part of the signal system previously described.

For a given change in volume in each of the reservoirs, there will be unequal changes of pressure. It is to compensate for these unequal changes of pressure that the fulcrum 81 is made adjustable. In other words, to obtain the proper relation of the lever arms on opposite sides thereof. The effective areas of the two bellows may be made the proper ratio to select the percent volume of normal volume (for a certain ambient temperature and load conditions on the cable) at which the relay will operate. Or the effective areas can be made equal and the fulcrum adjusted to take care of this ratio, as well as to compensate for the unequal changes of pressure for a given change in volume.

To compensate for the pressure head due to elevation of cable above the reservoir to which the larger bellows 77 is connected, spring 82 is adjusted, and to compensate for the pressure head due to elevation of cable above the reservoir to which the small bellows 78 is connected, spring 82ª is adjusted.

The relay described operates only when the fluid in the reservoir to which the larger bellows is connected drops to a percentage of its normal volume for the temperature and load conditions. In other words, one relay protects one reservoir. To protect the other reservoir, a second relay is provided and connected as shown. The contact devices or controllers of the relays may be connected to the signal circuit in any suitable manner, as for example as shown in Figs. 7, 8 or 9.

I am aware of the fact that it has been proposed to weigh the amounts of liquid contained in the respective reservoirs by mounting each reservoir on a tilting scale beam and to cause a signal to be given when the weight or quantity of liquid in one reservoir changes substantially by a fixed amount with respect to that of another in the same location. Such an arrangement is defective for the reason that if, for example a fixed change of 5 gallons has been selected as the basis of alarm low load and temperature conditions, the oil contents of the reservoirs of the three cables simultaneously approached the minimum permissible value, and a further drop of 5 gallons takes place in one of the reservoirs due to a leak in its connected cable, the cable may be injured before the alarm is given. On the other hand, as the oil contents of the reservoirs of the three cables simultaneously approached the maximum permissible value, a difference of 5 gallons in the reservoirs might be due to a slight difference in sizes of cables, stop joints and other connected apparatus. An arrangement depending upon a fixed quantity change of oil in the reservoirs can only be adjusted properly for one set of conditions, i. e., load, ambient temperature, etc. and these conditions may not again occur. Therefore, such an arrangement is not to be depended upon as conditions in a cable are constantly changing.

Additional reasons why such an arrangement is impractical for manhole use are clear from the following considerations.

Pressure reservoirs of the ordinary type on the average contain from 10 to 14 gallons of oil, have from 30 to 35 cells and weigh from 280 to 300 pounds each. Balanced pressure reservoirs, such as illustrated in Fig. 5 containing about the same amount of oil weigh approximately 460 pounds each. It requires great care to lower reservoirs of such great weight through manhole openings and greater care to install them in the manholes. They are mounted above the level of the cables which commonly means supporting them from the roof or upper side wall of the manhole. To securely support such a weight on a scale beam in a manhole would require a massive structure for which there is no available room, and for reasons readily appreciated, it is out of the question to enlarge the manholes. To so support a reservoir that it is capable of tilting with a change in the amount of oil contained therein also requires flexible connections between it and the oil piping, one which offers a negligible resistance to movement since otherwise it will seriously interfere with the accuracy of operation. As a practical matter, such flexible connections of a permanent character suitable for cables and reservoirs do not exist.

In addition my invention may be used to protect cables where there are no reservoirs, for example cables in a manhole having only stop joints. My system notes a percentage change in pressure and when adjusted indicates a like percentage change in reserve volume in the reservoirs and cables to which it is connected. However, since it is sensitive to percent pressure change, it can be used to indicate a departure from normal conditions where there is no appreciable reserve volume of fluid.

With respect to the feature of so arranging the relays that each is acted upon by the pressure of the fluid in a pair of reservoirs and their connected cables, the present application may be regarded as an improvement on my prior application Serial No. 756,632 filed Dec. 8, 1934.

What I claim as new and desire to secure by Letters Patent of the United States, is:

1. In combination, fluid filled cables forming a part of the same system of electrical distribution and in which the fluids therein are separately maintained, means independently supplying each of the cables with fluid under positive pressure, a signal system, and means acting in response to a determined percentage change of fluid pressure existing in one cable with respect to the pressure existing in another of said cables for causing operation of the signal system.

2. In combination, fluid filled cables forming a part of the same system of electrical distribution and in which fluids therein are separately maintained, separate pressure reservoirs occupying substantially the same location with respect to the cables for maintaining in each cable a supply of fluid under positive pressure, a signal system, and means acting in response to a determined percentage change of fluid pressure existing in one reservoir with respect to the pressure existing in another of said reservoirs for causing operation of the signal system.

3. In combination, fluid filled cables forming a part of the same system of electrical distribution and in which the fluids therein are separately maintained, means independently supplying each of the cables with fluid under positive pressure, a signal system, an element movable in response to a change of fluid pressure in one of the cables, a second element movable in response to a change of fluid pressure in another of the cables, said elements operating differentially, and means responsive to the joint action of the said elements upon a determined percentage change of fluid pressure in one means with respect to that in another for causing operation of the signal system.

4. A multi-phase system of electrical distribution comprising independent cables each containing insulating fluid, means independently supplying each of the cables with fluid under positive pressure, a relay device for the cable of each phase, each comprising a pair of elements which are movable in response to changes of fluid pressure in different cables, a signal system, and a controller for each pair of elements movable in response to the joint action of said pair of elements whenever a determined percentage change of pressure takes place within one cable with respect to the pressure in another of the cables for causing operation of the signal system.

5. In combination, independent fluid filled cables forming a part of the same system of electrical distribution and in which the fluids are separately maintained, balanced pressure reservoirs independently feeding fluid under positive pressure to the cables and receiving it therefrom, a signal circuit system, relay means each comprising a pair of elements operating differentially in response to a percentage change of fluid pressure in a pair of said reservoirs, and a controller movable in response to the differential action of said pair of elements for causing operation of the signal circuit system.

6. In combination, independent fluid filled cables forming parts of the same system of electric distribution, stationary reservoirs independently supplying insulating fluid to the cables at determined positive pressures, a signal system, controllers therefor, a means movable in response to a change of fluid pressure in a reservoir of one of the cables, and a second means movable in response to a change of pressure in a reservoir of another of said cables, the two means acting differentially upon a determined percentage change of pressure of the fluid in a pair of reservoirs to control the action of each of the controllers.

7. A cable system comprising independent lengths of cable containing fluid insulation and serving as parts of the same system of electrical distribution, reservoirs connected to the cables for supplying them with insulating fluid under determined pressures, separate relay means responsive to changes of fluid pressures in the separate cables, each of said means comprising a pair of diaphragms connected one to each of the reservoirs of different cables, one of said diaphragms exerting a greater effective force than the other, the two acting differentially upon a percentage change of pressure in one reservoir over that of another, a signal circuit, and switches in the signal circuit movable in response to the differential action of the diaphragms for controlling said circuit.

8. In combination, independent fluid filled cables forming parts of the same system of distribution, pressure reservoirs for supplying insulating fluid independently to the cables, a signal circuit, controllers therefor, bellows diaphragms, one of which has a greater effective area than the other, said diaphragms being each connected to and receiving fluid from separate reservoirs and movable in response to a percentage change in the relative pressures of the reservoirs, a means situated between the opposing faces of each pair of diaphragms and moved by the joint action thereof, and devices moved by the means to actuate the controllers.

9. A system of electrical distribution comprising independent cables each containing insulating fluid, reservoirs for independently supplying each of the cables with fluid under positive pressure, a relay device for each cable comprising a diaphragm connected to and receiving fluid from one of the cables, and movable in response to changes of pressure therein, and a second diaphragm connected to and receiving fluid from another of the cables and movable in response to changes of pressure therein, controllers each moved by the joint action of a pair of diaphragms in response to a percentage change of pressure therein and in the reservoirs, a signal system common to all of the cables and relays and actuated by the controllers, and a means acting on each pair of diaphragms to balance the effect thereon of the reserve head pressures in the reservoirs.

10. In combination, independent fluid filled cables forming parts of the same system of distribution, pressure reservoirs containing fluid under actual pressure plus reserve head pressure for supplying insulating fluid independently to each of the cables, a signal system, controllers therefor, pressure actuating diaphragms, one of which has a greater effective action than the other to cause differential action, said diaphragms being each connected to and receiving fluid from a separate reservoir and movable in response to a percentage change of actual pressure in one reservoir with respect to that in another, an elastic means acting on the diaphragms to balance the effect of reserve head pressure, and devices each actuated by the differential action of a pair of diaphragms for moving the controllers of the signal system when the actual pressure in one reservoir with respect to that in the other is changed by a determined percentage.

11. In combination, cables filled with fluid insulation and forming parts of the same system of distribution, a reservoir connected to each of the cables for maintaining fluid therein under positive pressure, the pressures of the fluids in the reservoirs during normal operating conditions changing by substantially the same amounts in the same interval of time, a signal system, means movable in response to the joint action of the fluid pressures within a pair of said reservoirs when the pressure in one of the reservoirs by comparison with the other has departed from said normal operating condition by a determined percentage, and controllers for the signal system actuated by the means.

12. In combination, independent cables filled with liquid insulation and forming parts of the same system of electrical distribution, a signal system common to all of the cables, independent reservoirs connected one to each of the cables for maintaining it under positive pressure, said reservoirs containing liquid and a gas and under positive pressure and occupying substantially the same relative positions with respect to the cables, a relay for each reservoir having a pair of diaphragms, one of which is connected to the liquid side of one reservoir and the other to the liquid side of another reservoir, and a switch for each of the relays moved by the joint action of the diaphragms thereof for actuating the signal system when the liquid pressure within one of the reservoirs is changed by a determined percentage from that of the others.

13. In combination, fluid filled cables forming parts of a multi-phase system of electrical distribution, a stationary reservoir containing a body of gas under pressure connected to the cable of each phase for maintaining the fluid therein under positive pressure, a signal system, a relay for each reservoir comprising a pair of diaphragms acting in opposition, one of which is larger than the other, the smaller one being connected to and acted upon by fluid from the reservoir of one phase and the larger one being connected to and acted upon by fluid from the reservoir of a different phase, a means movable in response to the differential action of the diaphragms upon a percentage change of pressure in one reservoir with respect to that in another, a balancing spring acting on each pair of diaphragms for compensating for the effects of pressure head, and a switch for each relay located in the signal system and actuated by the means.

14. In combination, lengths of cables filled with liquid insulation and forming a part of the same system of electrical distribution, joints uniting the lengths of cable which prevent the free flow of liquid from one length to another, said joints being located in spaced manholes, stationary reservoirs for the cables located in some of the manholes at approximately the same elevation as the cables supplied thereby, said reservoirs each comprising a sealed casing, a yielding means therein communicating with a cable which contains liquid that is supplied to and received from the cable through a joint, and a body of compressed gas acting on the yielding means to maintain the liquid therein under positive pressure, a relay for each cable and reservoir having a pair of diaphragms, one of which is moved in response to pressure changes within the reservoir of one cable and the other in response to pressure changes within the reservoir of a different cable, the action of each pair of diaphragms being responsive to a percentage change of pressure in a pair of cables and their connected reservoirs, a switch for each relay acted upon by a pair of diaphragms in response to a percentage change of pressure therein, and an electric signal system common to the several relays which is actuated by a determined movement of any one of the switches.

15. In combination, independent fluid-filled cables operating as a part of the same system of electric distribution, stationary reservoirs independently supplying each of the cables with fluid under positive pressure, relays, one for each of the cables, each relay comprising a pair of opposed fluid actuated elements operating differentially in response to a percentage change of pressure within a pair of reservoirs, a conduit connecting one of the pair of elements to one of the cables, a second conduit connecting the other of said pair to another of the cables, an electrical signal system for indicating an abnormal pressure condition within the reservoirs and cables and a circuit controller means for each relay forming a part of the signal system which is responsive to the differential action of the pair of elements of such relay.

16. In combination, three fluid-filled cables operating as a part of the same system of electrical distribution, stationary reservoirs independently supplying each of the cables with fluid under positive pressure, a relay for each of the cables comprising a pair of fluid pressure actuated diaphragms acting differentially in response to a percentage change of relative pressures in a pair of reservoirs, a conduit connecting one diaphragm of each pair to a cable, a second conduit connecting the same cable to one of the pair of diaphragms of another cable, an electrical signal system for indicating at a selected station an abnormal operating condition of the cables, a means movable in response to the differential action of a pair of diaphragms connected to different cables, and a controller in the circuit of the signal system which is moved with snap action by the means from a non-operative to an operative position upon the occurrence of an abnormal operating condition in one of the cables.

17. In combination, fluid-filled cables operating as a part of the same system of electrical distribution, stationary reservoirs independently supplying each of the cables with fluid under positive pressure, a relay for each of the cables comprising a pair of fluid actuated diaphragms each receiving fluid from a separate cable and acting differentially upon a determined percentage change of fluid pressure within one cable with respect to that in another of said cables, conduits connecting each pair of diaphragms with a pair of said cables, an electric signal system for indicating an abnormal operating condition within the cables, and means responsive to the differential action of each pair of diaphragms for controlling the signal system.

18. In combination, fluid filled cables forming a part of the same system of electrical distribution and in which fluids therein under positive pressure are separately maintained, a signal system, stationary reservoirs independently connected to and supplying fluid to the cables under positive pressure, relays in spaced relation to the reservoirs, one for each reservoir, each comprising a pair of diaphragms connected to and responsive to changes of fluid pressure within their connected reservoirs, the diaphragms exerting equal forces, a means for establishing differential action of the diaphragms effective upon a determined percentage change of pressure in one reservoir with respect to another connected to a different cable, and a controller for the signal system which is actuated by said means.

19. In combination, fluid filled cables forming a part of the same system of electrical distribution and in which fluids therein under positive pressure are separately maintained, a signal system, stationary reservoirs independently connected to and supplying fluid to the cables under positive pressures, a pair of diaphragms movable in response to changes of fluid pressures within a pair of reservoirs, the effective areas of the diaphragms being equal, said diaphragms having equal movements for the same change of pressure, a gear actuated by each of the diaphragms in response to a change of pressure therein, one of the gears having a greater diameter than the other so that the gears have dissimilar angular movement for a given diaphragm movement, and a controller actuated by the joint action of the gears for controlling the signal system.

20. In combination, a fluid filled cable, a stop joint in the cable preventing the flow of fluid from one part of the cable to the other, variable pressure reservoirs independently supplying fluid under positive pressure to the portion of the cable on opposite sides of the stop joint, said reservoirs and cables having approximately the same elevation, a signal system, relays acted upon differentially by a determined percentage change of the pressures of the fluids in the reservoirs connected to the cables on opposite sides of the stop joint, and circuit controllers for the signal system which are actuated by the relays.

21. In combination, a pair of fluid filled cables which are electrically connected, a stop joint between the cables preventing the flow of fluid between them, variable pressure reservoirs independently supplying fluid under positive pressure to portions of the cable on opposite sides of the stop joint, a signal system, sets of pressure actuated diaphragms, those of each set being connected one to a reservoir and the other to a diaphragm of the other set, a circuit controller for each set of diaphragms, and means causing the diaphragms of each set to operate differentially upon a percentage change of pressure in one of the reservoirs with respect to that in another to move the controller associated therewith.

22. In combination, fluid filled cables forming parts of a multi-phase system of electrical distribution, a reservoir connected to each of the cables for supplying fluid insulation thereto under positive pressure, said pressure rising and falling with changes in load on the cable, a relay for each cable that is responsive to pressure conditions in a pair of reservoirs and their connected cables, each relay comprising a pair of fluid actuated diaphragms of different diameters, one of which is connected to the reservoir of one cable and the other to the reservoir of a different cable, a lever acted upon by both diaphragms and normally held in a definite position by the diaphragm having the larger diameter and moved by the smaller diaphragm in response to a determined percentage change in the relative pressures in both diaphragms, a signal circuit common to the relays, a two-position switch for each relay for operating the signal circuit, and a means moved by the lever for moving the switch from one of its positions to the other.

LEWIS R. RUNALDUE.